Sheet No. 2.

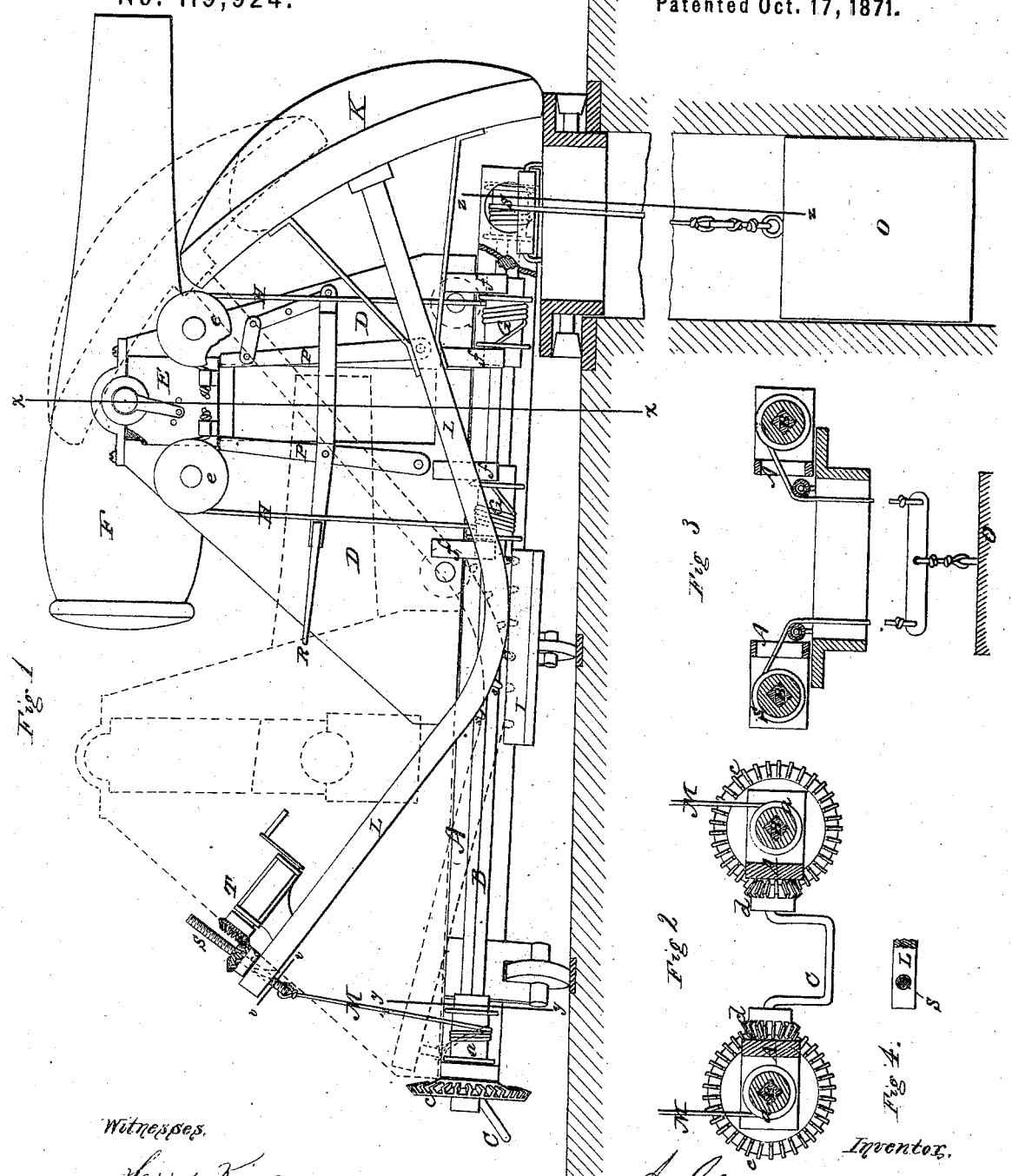

J. C. FOSTER.
Counterpoise Gun Carriage.

No. 119,924.                  Patented Oct. 17, 1871.

Witnesses.               Inventor.
Harry King              J. G. Foster,
Phil. T. Dodge         by Dodge & Munn
                                   Attys.

UNITED STATES PATENT OFFICE.

JOHN G. FOSTER, OF BOSTON, MASSACHUSETTS.

IMPROVEMENT IN COUNTERPOISE GUN-CARRIAGES.

Specification forming part of Letters Patent No. 119,924, dated October 17, 1871.

*To all whom it may concern:*

Be it known that I, JOHN G. FOSTER, of Boston, in the county of Suffolk and State of Massachusetts, have invented certain Improvements in Counterpoise Gun-Carriages, of which the following is a specification, reference being had to the accompanying drawing.

My invention relates to counterpoise gun-carriages for ordnance, in which the gun is lowered behind the parapet when it is to be loaded; and the invention consists, first, in a novel manner of mounting the gun and arranging therewith a counterpoise-weight which also serves as a shield to protect the gunners and the carriage; second, in a supplemental counterpoise to be used in case the first one is shot away or disabled; and, third, in an arrangement of devices for supporting the gun so that it can be operated as on a common carriage when both counterpoises are disabled.

Figure 5:
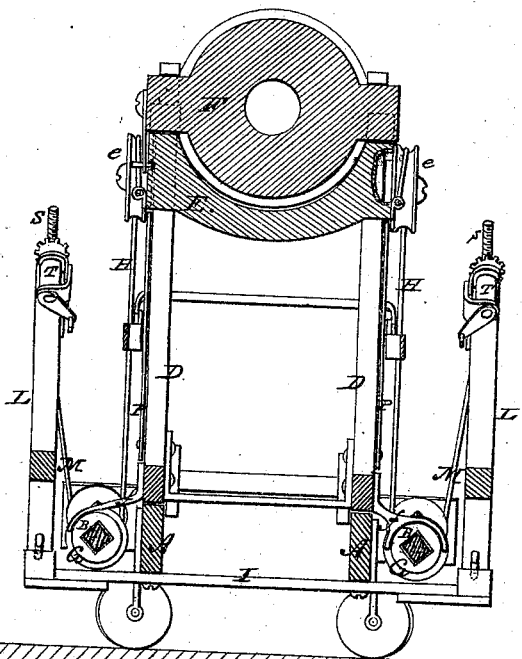
Figure 6:
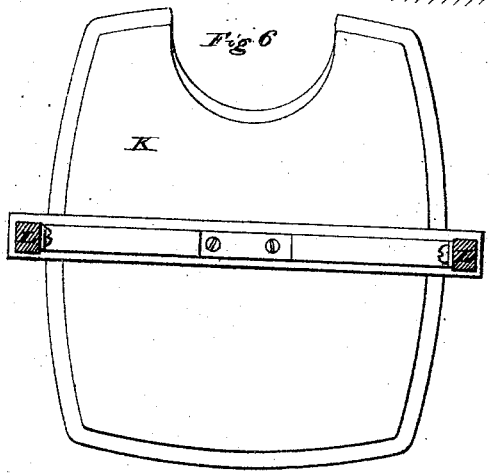

Fig. 1 is a side elevation of my improved carriage complete, with a gun thereon, the gun being elevated and run forward in position to be fired. Figs. 2 and 3 are cross-sections of the carriage on the lines $y\ y$ and $z\ z$, respectively. Fig. 4 is a cross-section of one of the screws for tightening up the chains taken on the line $v\ v$ of Fig. 1. Fig. 5 is a vertical section through the gun and carriage on the line $x\ x$ of Fig. 1. Fig. 6 is a cross-section just behind the counterweight-shield, showing an inside face view of the same. My improved carriage, as a whole, consists of three principal parts, viz.: the chassis, the carriage proper, and the counterpoise. In constructing my carriage I first provide the chassis A of the same form and construction as those now in general use, and along each side of the same I mount a strong square shaft, B, provided on its rear end with a fixed drum, $a$, as shown in Figs. 1 and 2. To the rear end of each shaft B I attach a bevel-wheel, $c$, and across the rear end of the chassis I mount a crank-shaft, C, provided on its ends with pinions $d$, which gear into the respective wheels C, as shown in Figs. 1 and 2, so that when the crank is turned it rotates both of the shafts. On the chassis I mount the sliding-top carriage or carriage proper, D, constructed in the same general form and manner as the common gun-carriage now in use, but much higher. In each side or cheek of the carriage I form a large vertical slot, and in each of these slots I mount a sliding block, E; and I then mount the gun F in the carriage with its trunnions bearing on the blocks E, as shown, so that the gun may be raised and lowered by sliding the blocks up and down in the slots. On each side of the carriage, at or near the top, I mount two pulleys, $e$, and on each of the square shafts B I mount two sliding drums, G, connected by arms $f$ to the carriage, as shown in Figs. 1 and 5, so that when the carriage slides on the chassis the drums are carried with it along on the shafts. Over each pulley $e$ I pass a chain, H, and wind one end of the same upon the corresponding drum G below, and attach the other end to the block E, as shown, so that when the shafts B are turned the chains H are wound on the drums, and the blocks E, with the gun thereon, raised, or lowered if the shafts are turned in the reverse direction. Across under the middle of the chassis I secure a strong plate, I, with its ends projecting out on each side of the same, as shown in Figs. 1 and 5. I next provide two strong iron beams, L, of a length about equal to that of the chassis, bent at their middle so that the two ends stand at about one hundred and thirty degrees to each other. These I mount one on each side of the chassis, with their bent portion or elbow resting on the projecting ends of the plates I, and to the forward end of the two I secure the counterpoise-weight K, which I make in the form of a shield, and of a weight equal to that of the gun and the blocks E. The weight K tends, of course, to depress the forward ends of the beams, and, consequently, to throw their rear ends up. To the rear end of each beam L I attach a chain, M, and pass the lower end of the chain around the drum $a$, on the adjoining shaft B, as shown in Figs. 1, 2, and 5, so that when the shafts are turned the chains are wound on the drums, and thereby the rear ends of the beams drawn down, and their front ends, with the counter-weight thereon, raised up. The chains H and M I wind on their respective drums in opposite directions, so that when the shafts B are turned one set of chains is wound up while the other is unwound.

When the various parts are arranged as described it will be seen that the chains H, supporting the gun, will tend to turn the shafts B in one direction, while the chains M, supporting the counter-weight, will tend to turn them in the opposite direction; and that, as the weight of the gun, on one hand, and that of the counter-weight on the other, equal each other, the parts will balance each other, and thus remain in any position in which they are placed. When, therefore, the crank C is turned so as to rotate the shafts B in one direction the chains M are unwound and the counter-weight lowered, and at the same time the chains H wound up and the gun elevated in position for firing, as shown in Fig. 1. When, however, the crank is turned so as to rotate the shafts in the opposite direction the chains H are slackened and the gun thereby lowered, and the chains M wound up and the counter-weight shield elevated above the muzzle of the gun, as represented in dotted lines in Fig. 1. Thus, it will be observed that when the gun descends the counter-weight rises above it, and that when the gun rises the counter-weight descends out of its way.

As the gun and the weight just balance each other, it is only necessary in raising and depressing the gun to exert sufficient force to overcome the friction of the moving parts, and therefore the gun can be manipulated by one or two men with perfect ease.

When the gun is to be fired it is first elevated and then the carriage run forward on the chassis so as to carry the muzzle of the gun out over the counterpoise shield. When the gun is fired the recoil moves it and the carriage back so as to bring the muzzle in rear of the counter-weight. The gun is then lowered to be loaded, the counter-weight being thereby elevated over the muzzle, as shown in Fig. 1. The counter-weight when elevated serves both to protect the gun from direct and curvilinear fire, and the gunners from all shrapnel, fragments of shells, &c., whether of a curved or vertical fire.

The curved beams L I provide, on their elbows or curved portions, with teeth $s$, and, in the supporting-plate I, I make recesses to receive said teeth, as shown in Fig. 1, so that as the beams rock or tip the bearing-point is changed forward and backward. By this arrangement I maintain a constant equilibrium between the gun and weight, which would not be the case if the bearing-point or fulcrum of the means remained unchangeable, for the reason that as the weighted ends of the beams approach a vertical position they exert less and less strain upon the chains at the opposite ends, while the weight of the gun remains always the same.

To provide against disablement of the gun in case the counter-weight K or its beams are shot away or broken, I attach to the front end of each shaft B a drum, $s$, and under the front end of the chassis I form a well or pit, and place therein a weight, O, which may be connected by chains with the drums $s$. This weight I make of the same weight as the gun, so that when connected it answers, so far as raising and lowering the gun is concerned, the same purpose as the weight K. On each side of the carriage D I pivot two upright arms or bars, P, which can have the upper ends turned under the block E when the latter is elevated, so as to support the gun in position and prevent it from falling in case any of the parts are broken or shot away. These arms I connect together in the manner shown, or in any other suitable manner, so that they may all be moved simultaneously by means of a single handle or lever, R. If at any time it should happen that the shafts or other parts are so injured that the counter-weights cannot be used, the gun can be elevated and supported by arms P, and then loaded in the ordinary manner without being raised or lowered.

When either of the counter-weights are used the friction of the sliding drums G on the shafts will serve to check or aid in checking the recoil of the carriage. This friction is, however, objectionable when the gun is to be run forward, as sufficient power must be exerted by the gunners to overcome the friction and move the carriage. To remedy this difficulty I connect the chains M to the rocking beams by a screw-rod, S, which passes through the beam, and a loose bevel-pinion thereon, and on the beam I mount a crank and pinion, T, for operating the nut-pinion, as shown in Fig. 1. The gun, after being loaded, is elevated and supported by bars P, and then the cranks T turned so as to let down the counter-weight onto the chassis. In this way the drums are set free, so that the carriage can be run forward with ease. The cranks are then turned so as to tighten up the chains and bring the weight into action again. The arms $f$, which connect the sliding drums to the carriage, I make very strong, and of such form as to bear on top of the drums or journals thereon, so as to prevent the shafts B from being bent by the upward strain of the chains H.

Instead of the slots in the carriage for blocks E being vertical, they may be inclined either to the front or rear, the latter being preferable on account of better resisting the force of the recoil. The inclination may even be made as much as forty-five degrees, in which case the slot will form an inclined plane, and the gun-block E will be made like a top carriage.

Instead of using the screw S and crank and pinion T to slacken the chains and relieve the drums of friction when running the gun forward, the same result may be accomplished by arranging the wheels $e$ so that they can be lowered, or the shafts B so that they can be raised to slacken the chains.

Having thus described my invention, what I claim is—

1. The carriage D having the gun mounted to rise and fall therein, as described, and provided with the pulleys over which cords pass for elevating and lowering the gun, as set forth.

2. In combination with a gun mounted as above described, the bars P or their equivalents, whereby the gun can be supported independent of the counterpoise, substantially as and for the purpose set forth.

3. The combination of the gun-carriage D and the chassis having the shafts B with their sliding drums mounted thereon, and arranged to operate substantially as described.

4. The combination of the counterpoise K and its frame L having the device for loosening the chains M applied thereto, and the shafts B having the sliding drums mounted thereon, with the supports P and the gun F arranged to move up and down, all arranged to operate substantially as described.

5. The counterpoise K made in the form of a shield, and arranged to protect the gun and men, substantially as described.

6. In combination with the carriage D having a gun mounted thereon, as described, and the shafts B with their sliding drums, the counterpoise or weight O, whereby the gun can be operated in case the counterpoise K or its frame is disabled, as set forth.

JOHN G. FOSTER.

Witnesses:
CHAS. B. F. ADAMS,
A. W. ADAMS.

(105)